United States Patent [19]

Jennerjohn et al.

[11] 4,436,169

[45] Mar. 13, 1984

[54] ELEVATING AND TILTING MECHANISM FOR CRANE CAB

[75] Inventors: Dennis A. Jennerjohn; Lyle B. Jensen, both of Cedar Rapids, Iowa

[73] Assignee: FMC Corporation, Chicago, Ill.

[21] Appl. No.: 342,287

[22] Filed: Jan. 25, 1982

[51] Int. Cl.³ .............................................. B62D 23/00

[52] U.S. Cl. ................................ 180/89.14; 296/190; 414/917

[58] Field of Search ............... 180/89.13, 89.14, 89.15, 180/327, 328; 414/917, 743; 296/190, 200

[56] References Cited

U.S. PATENT DOCUMENTS

| | | | |
|---|---|---|---|
| 3,721,077 | 3/1973 | Van Der Lely | 180/89.13 |
| 3,891,264 | 6/1975 | Hunter | 180/89.13 |
| 3,957,165 | 5/1976 | Smith | 180/89.13 |
| 4,206,826 | 6/1980 | McMillen | 180/89.14 |
| 4,344,734 | 8/1982 | Shumaker | 414/917 |

FOREIGN PATENT DOCUMENTS

| | | | |
|---|---|---|---|
| 2085839 | 5/1982 | United Kingdom | 414/743 |

*Primary Examiner*—Bruce H. Stoner, Jr.
*Assistant Examiner*—John A. Carroll
*Attorney, Agent, or Firm*—Ronald C. Kamp; Richard B. Megley

[57] ABSTRACT

An elevating and tilting mechanism for a crane cab having a sub-frame mounted to the upper works, a pair of outer arms pivotally connected to the sub-frame and to the platform, a central inner arm pivotally connected to the sub-frame and the platform to form a parallelogram linkage. A pair of elevating rams connected between the cab frame and the outer arms. A cab is pivotally mounted at its rear to the platform and has a pair of hydraulic tilting rams connected between the platform and the cab.

6 Claims, 6 Drawing Figures

ELEVATING AND TILTING MECHANISM FOR CRANE CAB

BACKGROUND AND SUMMARY OF THE INVENTION

Proper operation of a crane dictates that the operator's line of sight to the load as it is lifted, to possible overhead obstructions, and to spotters positioned to direct the operator through hand signals be unimpaired. Such line of sight visibility can be enhanced by elevating the operator relative to the crane, and prior art arrangement have been provided for this purpose. Similarly, tilting the operator rearward can improve visibility overhead, or at least provide comparable visibility with less physical strain on the operator. Prior art arrangements have provided a tilting mechanism.

The present invention provides both elevating and tilting capability, which capabilities are independently controllable, and utilizes a parallelogram linkage to maintain the cab platform level as it is elevated and to move the cab laterally to the side of the crane to reduce the visual obstruction normally resulting from the crane boom. The structural arrangement for the elevating mechanism is also compact permitting the cab, in its lowered position, to be positioned in close proximity to the crane upper works, is relatively simple and inexpensive to manufacture and maintain, and may be readily removed with the cab as a unit to facilitate disassembly of the crane for transport between job sites.

DETAILED DESCRIPTION

Figure 1:
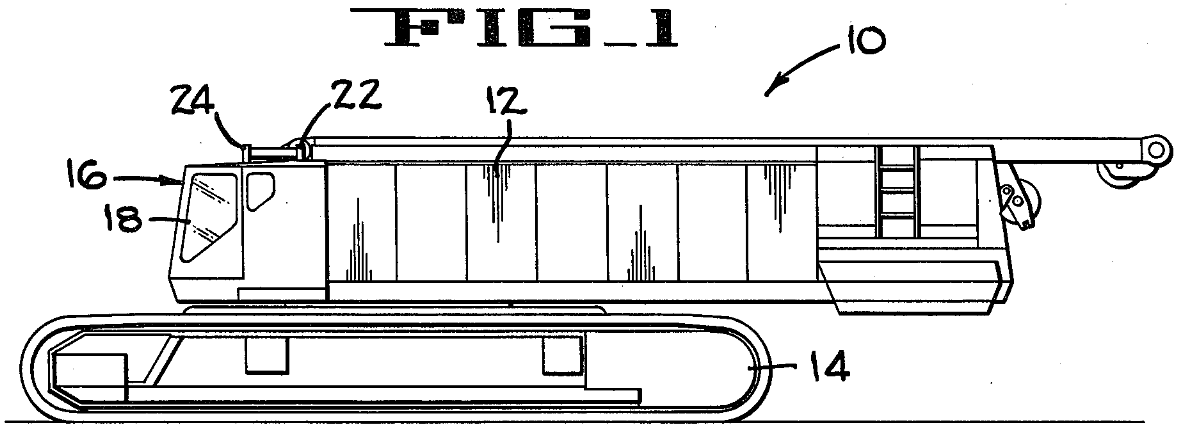
FIG. 1 is a side elevation of a crane embodying the present invention.
Figure 2:
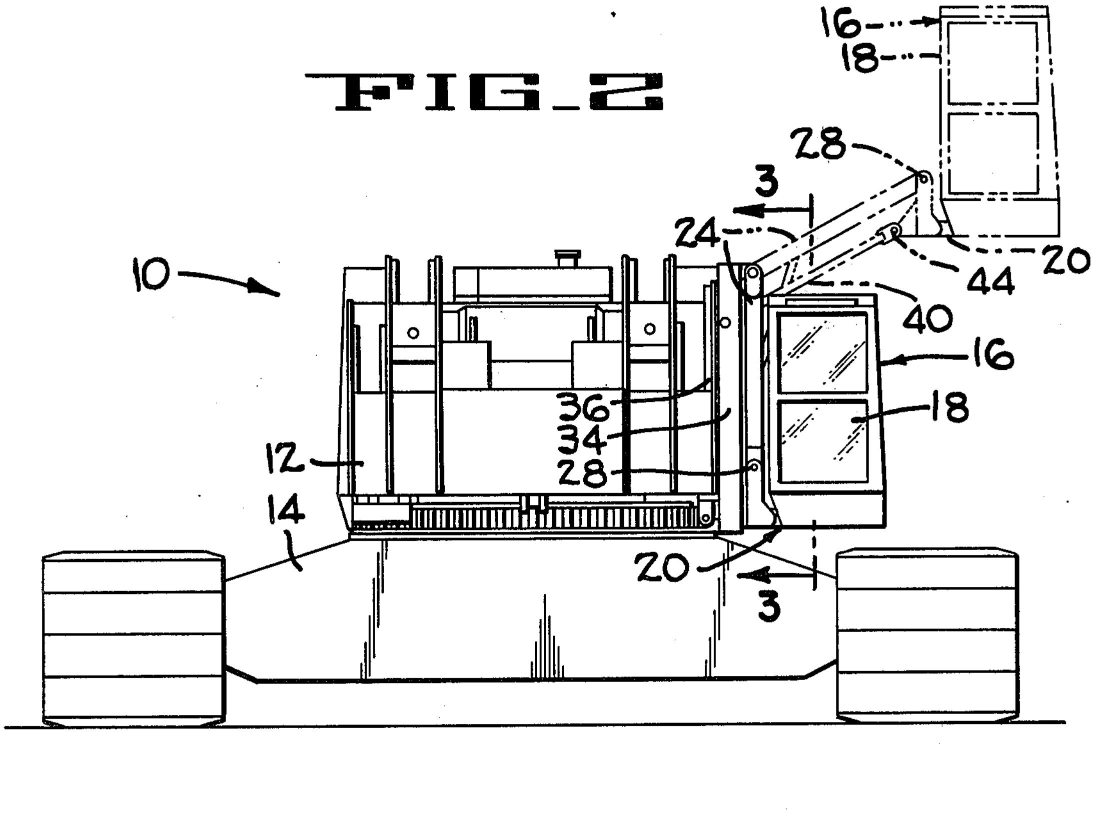
FIG. 2 is an end elevation of the crane of FIG. 1.
Figure 4:
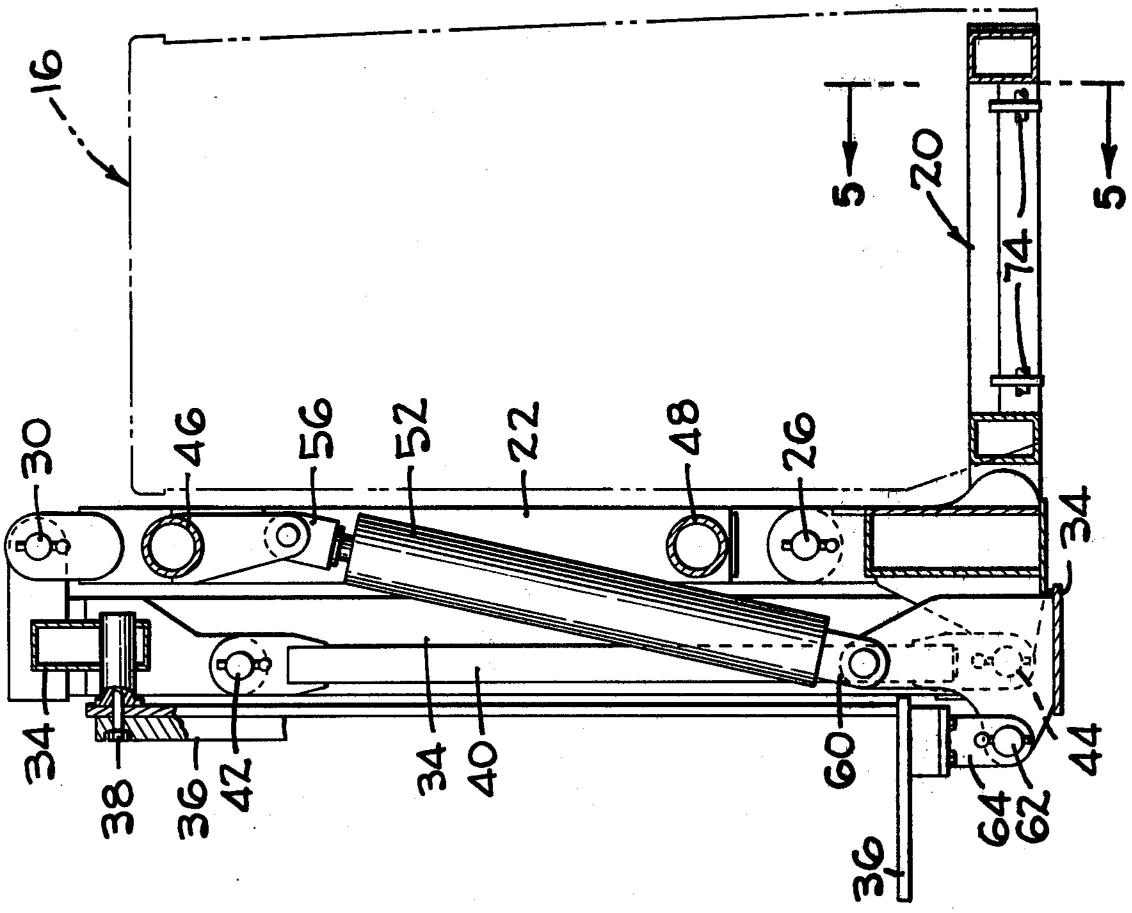
FIG. 4 is a section taken along lines 4—4 of FIG. 3 further illustrating the linkage for elevating the operator's cab.
Figure 3:
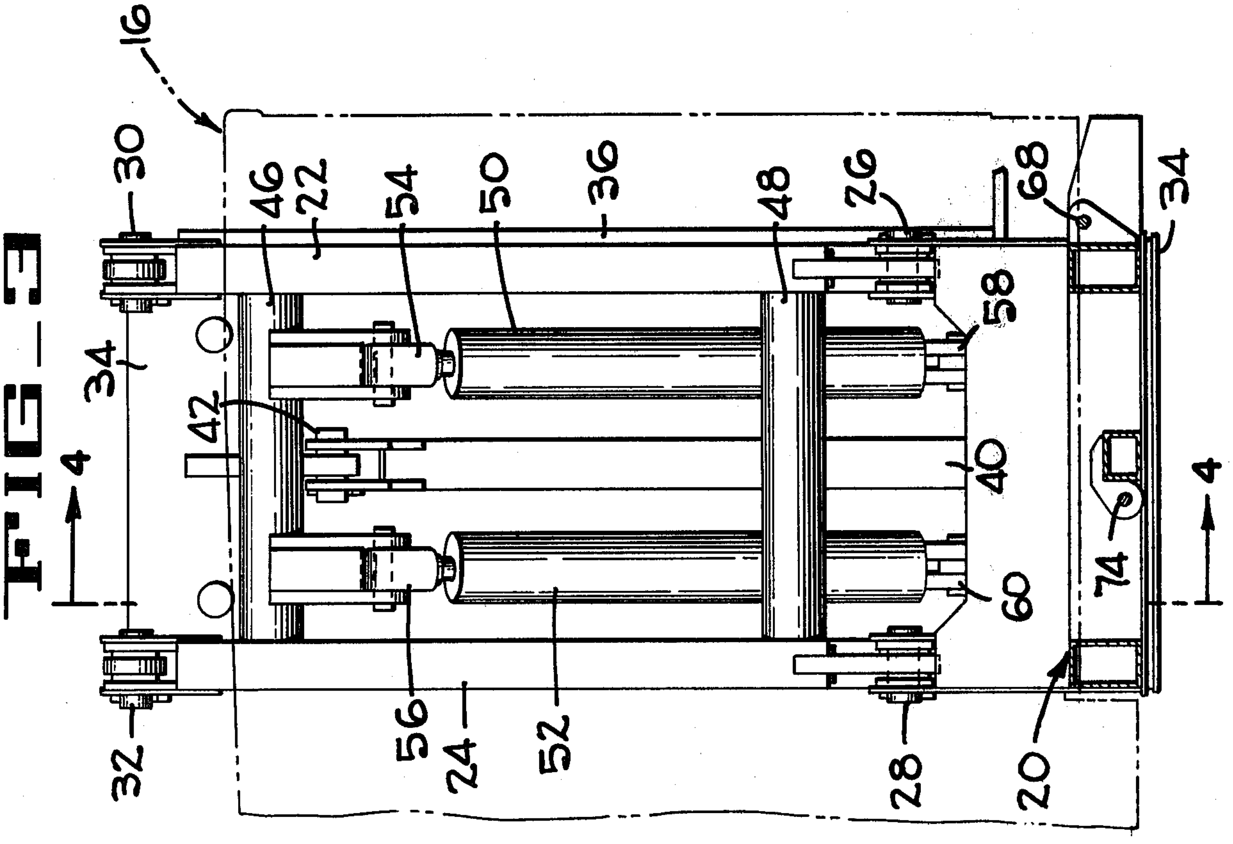
FIG. 3 is a section taken along lines 3—3 of FIG. 2 illustrating the linkage for elevating the operator's cab.

Referring now to FIGS. 1 and 2, there is shown a crane indicated generally at 10, including an upper works 12 rotatably mounted on a lower works 14 for swinging of the upper works relative to the lower works on a vertical axis. An operator's cab, indicated generally at 16, is mounted on the left front corner of the upper works 12. The cab 16 includes an operator's compartment 18, with suitable windows, a seat and control levers and pedals, as are conventional, mounted on a platform 20. As best shown in FIGS. 3 and 4 the platform 20 is pivotally connected to a pair of arms 22 and 24 by pins 26 and 28 respectively. The upper ends of the arms 22 and 24 are pivotally attached by pins 30 and 32 to a sub-frame 34, which is secured to the frame 36 of the upper works 12 by bolts 38. A third arm 40 is also pivoted at its upper end to the frame 36 by pin 42 and at its lower end to platform 20 by pin 44. The arm 40 forms a parallelogram linkage with the two arms 22 and 24 so that the platform 20 remains essentially level as the arms are pivoted outward from the upper works 12 about their upper pins. The arms 22, 24 and 40 are of equal length and the axes of pins 30 and 32 must be aligned, as must the axes of pins 26 and 28, because the upper pins 30 and 32 define an axis of rotation for the four-bar or parallelogram linkage, as do the lower pins 26 and 28. In order to maintain torsional stability, a pair of tubular members 46 and 48 are secured between the arms 22 and 24.

Raising and lowering of the platform 20 is achieved by extension and retraction of a pair of double-acting rams 50 and 52. The rod ends 54 and 56 of rams 50 and 52 respectively are pinned to suitable brackets secured to the upper cross tube 46, while the cylinder ends 58 and 60 thereof are pinned to the lower end of the sub-frame 34, which sub-frame is pinned at its lower end to the frame 36 of the upper works 12 by pins 62 through a suitable bracket 64 bolted to the lower side of frame 36. Retraction of the rams 50 and 52, as shown in FIGS. 3 and 4 will position the cab 16 in its lowered position, as illustrated by the solid lines in FIG. 2, an extension of those rams will raise the cab 16 to its raised position, as illustrated by the dotted lines in FIG. 2. The cab will remain level as it moves between those positions because of the parallelogram linkage formed by arms 22, 24 and 40.

Figure 5:
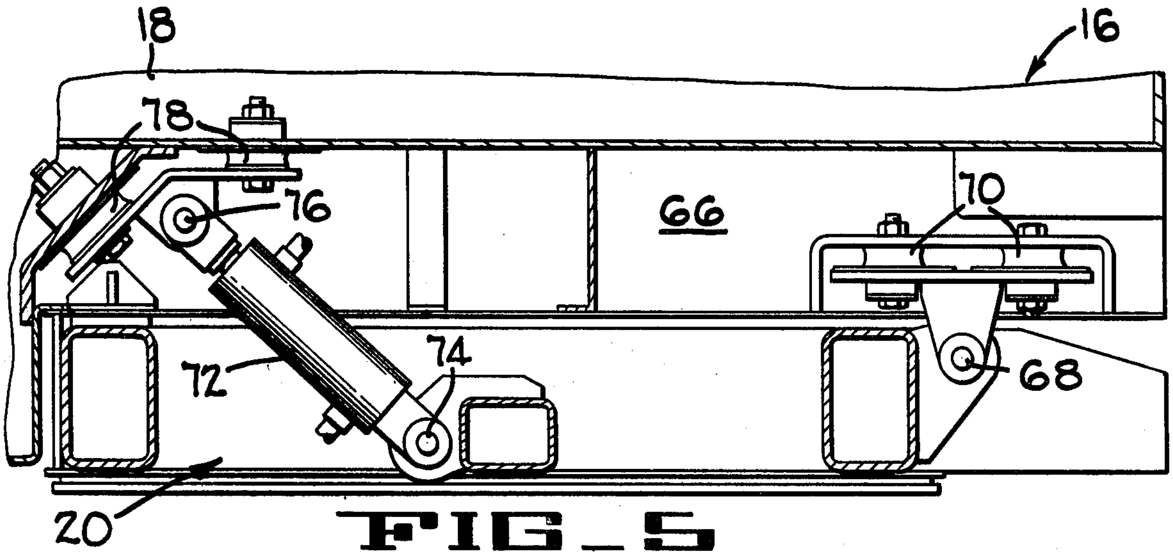
FIG. 5 is a fragmentary section taken along lines 5—5 of FIG. 4 showing the linkage for tilting the operator's cab.
Figure 6:
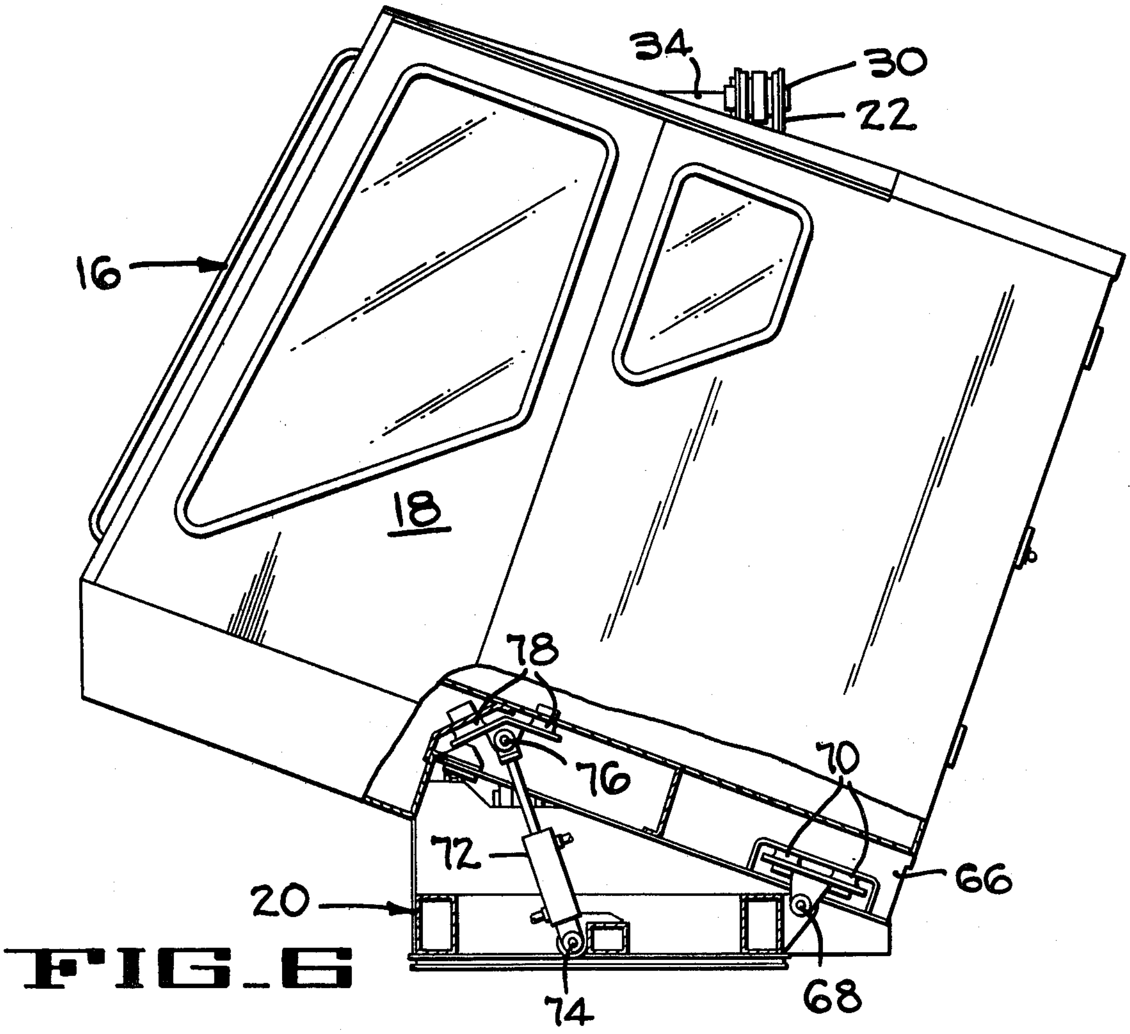
FIG. 6 is a side elevation illustrating the operator's cab in the tilted position.

Referring now to FIGS. 5 and 6, the cab 16 includes a frame 66 which is pivotally connected at its rearward end to the platform 20 by pins 68. Suitable vibration isolators 70 may be interposed between the frame 66 and its connection to pins 68 to reduce the transmission of noise and vibration from the platform 20 to the cab 16. The pins 68, however, define a pivot axis for the cab 16 relative to the platform 20. A pair of double-acting hydraulic rams, one of which is shown at 72, have their cylinder ends connected by pins 74 to the platform 20 and their rod ends connected by pin 76 to the frame 66 of the cab 16. Again, suitable vibration isolators 78 may be interposed between the frame 66 and its connection to pin 76 to reduce noise and vibration within the cab 16. Extension of the rams 72 will cause the cab 16 to pivot about pin 68 raising the front of the cab 16, or stated differently, tilting the cab back, as shown in FIG. 6. Retraction of the rams 72 will cause the cab 16 to return to a level orientation on the platform 20, as shown in FIG. 5.

It will be noted that the frame 34 is just slightly taller than the cab and the rams 50 and 52 in their lowered position (see FIGS. 3 and 4) connect between a point adjacent the upper works and to the outer rams 22 and 24. This permits a compact arrangement with the cylinder stroke necessary to elevate the platform 20 above the level of the frame 34. The entire cab and its elevating and tilting mechanism may be easily removed for disassembly simply by removal of pins 62 and bolts 38, which facilitates transportability. The tilting cylinder 72 tucks within the frame 66 and the platform 20 to provide a compact arrangement.

While one embodiment of the present invention is shown and described herein, it is understood that various changes and modifications may be made thereto without departing from the spirit of the invention as defined by the scope of the provided claims.

What is claimed is:

1. In combination with a crane having a lower works rotatably supporting an upper works including an upright wall, an elevatable cab movable between lowered and raised positions comprising:

a subframe connected to said upper works;

an inner link pivotally connected at its upper end to said subframe and at its lower end to said cab and positioned parallel to and adjacent said wall when said cab is in its lowered position;

a pair of outer links oriented parallel to said inner link and pivotally connected to said subframe and said cab at their upper and lower ends respectively;

upper and lower cross tubes connected between said outer links; and hydraulic rams positioned between said inner link and outer links and pivotally connected between said subframe and one of said cross tubes, whereby extension of said rams will cause said cab to be raised and contraction of said rams will cause said cab to be lowered to a position adjacent said upper works.

2. The invention according to claim 1, and further comprising:

mounting brackets secured to the under side of said upper works;

pin means removably insertable through said mounting brackets and the subframe; and bolts extending through said side wall and engageable with the upper portion of said subframe to permit attachment and removal of said cab, rams and subframe as a unit.

3. In combination with a crane having a lower works rotatably supporting an upper works including an upright wall, an elevatable cab movable between lowered and raised positions comprising:

a subframe connected to said upper works;

an inner link and a pair of outer links, each pivotally connected at their upper ends to said subframe;

a platform pivotally attached to the lower ends of said links;

said links being of equal length and positioned adjacent and parallel to said wall with said cab in its lowered position;

upper and lower cross members attached between said outer links;

a hydraulic ram positioned on each side of said inner link and pivotally connected to said upper cross tube and to said subframe; and a cab mounted on said platform.

4. The invention according to claim 3, and further comprising:

means pivotally mounting the rear of said cab on the rear of said platform; and hydraulic tilt rams pivotally connected between said cab and said platform, whereby extension of said tilt rams will tilt said cab.

5. The invention according to claim 4, and further comprising:

removable bolt means insertable through said wall to engage the upper portion of said subframe;

mounting bracket means secured to said upper works; and pins insertable through said mounting bracket means and the lower portion of said subframe to permit removal and attachment of said elevatable cab as a unit.

6. In combination with a crane having a lower works rotatably supporting an upper works with a front end and a side wall, an elevatable and tiltable cab to facilitate operation of said crane from said cab comprising:

a subframe mounted on said side wall;

a parallelogram linkage connected to said subframe and movable in a plane parallel to said front end;

a platform connected to said linkage;

a cab pivotally mounted at its rear end to said platform on an axis substantially parallel to said front end;

first hydraulic ram means pivotally connected between said subframe and said linkage to elevate said cab laterally to the side of said upper works; and second hydraulic ram means pivotally connected between said platform and said cab to tilt said cab about its rear pivotal connection to facilitate viewing in front of and above said front end.

* * * * *